Figure 1:
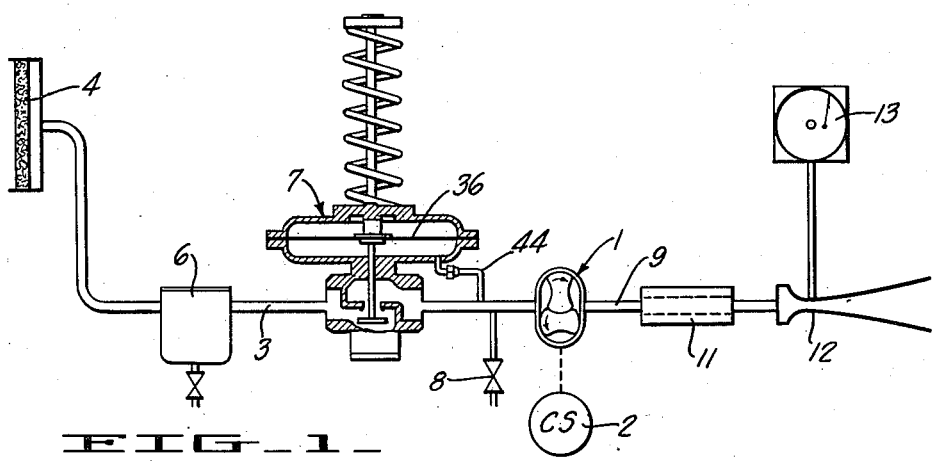

Jan. 14, 1958   A. C. SCHMIDT ET AL   2,819,774
CONSTANT FLOW SUCTION UNIT
Filed June 4, 1956   2 Sheets-Sheet 1

INVENTOR.
Alfred C. Schmidt
Francis J. Sisk
BY

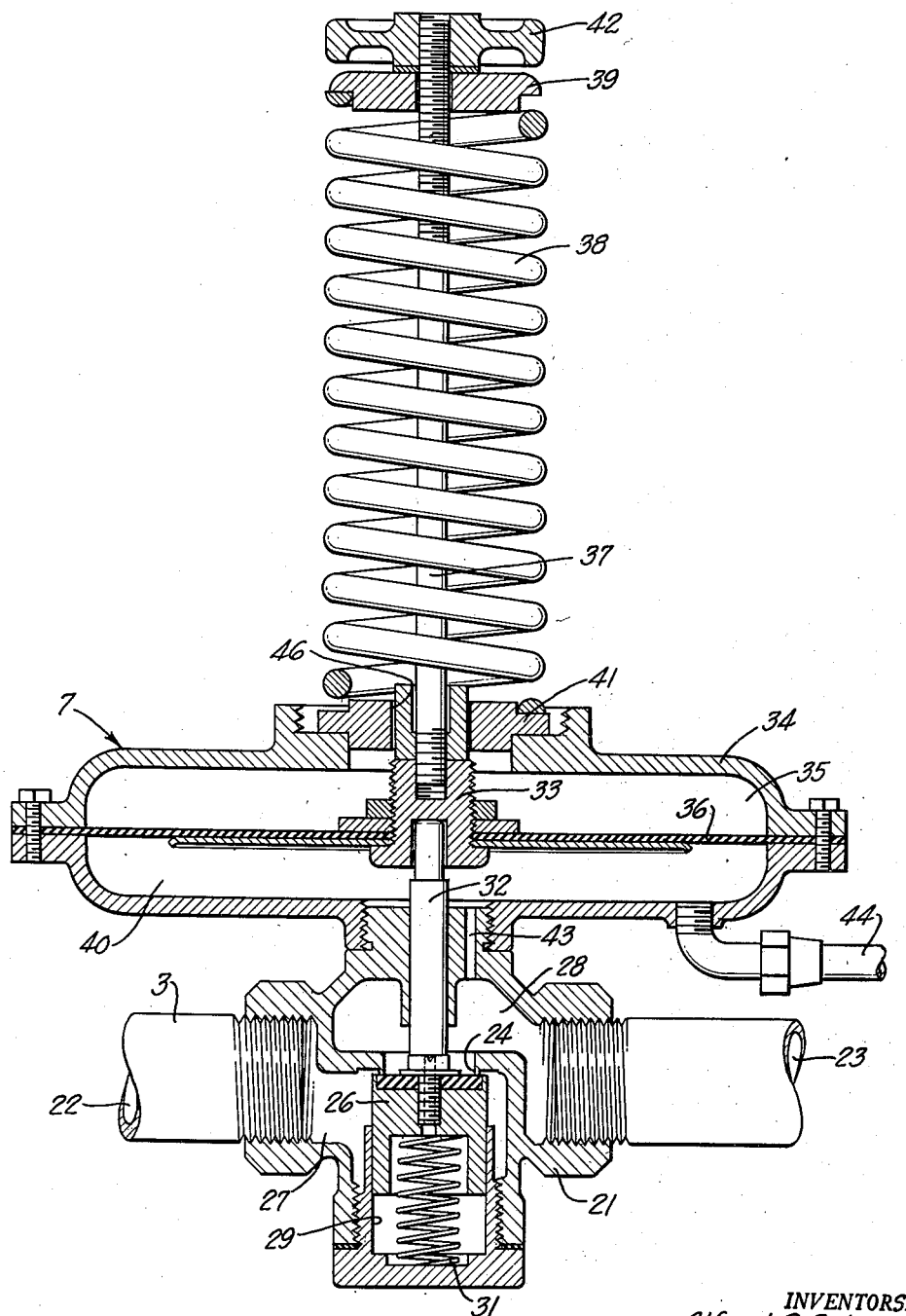
Jan. 14, 1958    A. C. SCHMIDT ET AL    2,819,774
CONSTANT FLOW SUCTION UNIT
Filed June 4, 1956    2 Sheets-Sheet 2
FIG_2_
INVENTORS.
Alfred C. Schmidt
Francis J. Sisk
BY

United States Patent Office 2,819,774
Patented Jan. 14, 1958

2,819,774
CONSTANT FLOW SUCTION UNIT

Alfred C. Schmidt, San Carlos, Calif., and Francis J. Sisk, Pittsburgh, Pa.

Application June 4, 1956, Serial No. 589,348

6 Claims. (Cl. 183—37)

(Granted under Title 35, U. S. Code (1952), sec. 266)

The invention described herein may be manufactured and used by or for the Government of the United States of America for governmental purposes without the payment of any royalties thereon or therefor.

This invention relates generally to suction pumps and more in particular a method and apparatus for pumping a fluid at a constant rate through a member which presents a varying resistance to the flow.

In certain types of work, such as in aerosol sampling, it becomes desirable to provide a suction unit capable of automatically drawing air into a collecting filter at a constant rate regardless of the amount of deposit on the filter and, frequently, the use of this type of apparatus is required at different field locations so that the apparatus itself must be readily portable.

It is known that many different types of suction machines are used in air sampling work, but so far as presently is known, they are not able to maintain a constant air flow rate into a collecting filter without the constant attention of a skilled operator. In general, these earlier units consisted simply of a pump and a motor with perhaps a filter to protect the pump, as well as some means for changing the speed of the pump and a meter for indicating the flow rate. However, in use, the amount of air drawn into the filter, as well as the suction produced, depended primarily on the resistance to be overcome and, since air is compressible to the extent that it expands when the pressure is reduced, it follows that the greater the suction, the greater the volume that a given mass of air occupies and, of course, the less mass of air the pump actually handles for a given displacement. In other words, without the constant attention of an operator, the flow rate of these ordinary suction units could not be maintained at a constant because the density of the air entering the pump fluctuated widely with the resistance of the filter element. Of course, if an operator were available, appropriate adjustments of the pump speed could be made, but in many situations, such as the sampling of noxious or radioactive aerosols, the operator obviously cannot safely be in constant attendance. Also, in any type of work, accuracy depends solely on the skill and alertness of the operator.

It is, therefore, a primary object of the present invention to provide a unitary, self-contained suction apparatus that can be connected to a permeable member, such as a filter, the apparatus being capable of automatically maintaining at a constant the intake fluid flow rate into this permeable member.

Another object is to provide a relatively light, compact and easily portable constant flow suction unit in which the flow rate into the collecting medium is maintained at a constant.

Yet another object is to provide an unusually simple and durable unit for the purposes described in the foregoing objects.

A further related object, which will become more readily understandable, is that of providing a means for maintaining the intake pressure of a suction pump at a constant regardless of any upstream pressure variations such as an increased flow resistance produced at a filter intake.

According to the invention, a fixed displacement pump is used to apply suction pressure to a permeable member, such as a filter, the permeability or flow resistance of which is subject to unpredictable fluctuations depending, for example, on filter deposits. It might be stated at this point that the air filter aerosol sampling operation simply is exemplary of the invention and that there is no intent of limiting the scope solely to this one embodiment.

Continuing with the general principles of the invention, one of the more important departures from prior art is the fact that instead of permitting the entire intake pressure to act on the permeable member, the present invention limits the amount applied, thereby, in a sense, holding in reserve such additional pressure as may be needed to offset the increased demand. Viewed in another manner, the present thought is to operate the fixed displacement pump at a particular speed capable of producing a fixed reduced pressure condition, and to apply only such a portion of this pressure on the filter as is needed to establish the desired intake flow rate at the filter. For the purpose of introducing such a pressure drop as will limit the pressure at the filter, some means, such as a valve, is employed in the line between the filter and the pump. Further, another very important requirement is that the valve be made responsive to pressure conditions at the pump intake so that, should the intake suction at the pump increase due to a relatively clogged condition of the filter, the valve opens to reduce the pressure drop and permit an offsetting or compensating suction force to be applied to the filter.

The problem then resolves into one of degree or extent to which the pressure drop should be varied if a constant flow rate into the filter is to be achieved, and the answer lies in the thought that, if the density of the air entering the fixed displacement pump is maintained at a constant, then the mass of free air flowing through the unit must remain a constant and the flow rate into the filter also will be constant. To clarify this effect, it might be assumed that the atmospheric pressure at the pump intake suddenly were decreased. If this decrease were not immediately offset, the mass of free air flowing into and being displaced by the pump would materially decrease because of the normal expansion of air under reduced atmospheric conditions. Likewise, if the pump were handling less free air mass due to the increased suction, the flow rate into the filter would drop.

An important feature, therefore, is the maintenance of a constant pump intake pressure since such a maintenance assures a constant flow rate through the filter. Consequently, the invention requires the valve, or its equivalent, to open or close in response to intake pressure of the pump and, preferably, some pressure sensitive valve-actuating means, such as a valve-stem-connected diaphragm is utilized for this purpose. The net result is that the opening of the valve in response to build-up of suction at the pump not only reduces the line pressure drop so as to apply additional pressure at the filter, but it immediately offsets suction build-up at the pump so as to maintain the pump intake pressure as a desired level. Actually, as will be appreciated, these effects are unitary or inseparable to the extent that one is produced by the other and it is primarily for the clarity of the present description that they are considered as separate features.

The preferred embodiment is illustrated in the accompanying drawings of which Fig. 1 is a schematic flow diagram showing mostly in block-form the various elements used in a constant flow suction apparatus such as might be used for aerosol sampling work; Fig. 2 a vertical section of the vacuum control means of Fig. 1, and Fig. 3, a plot contrasting the flow control obtained by the preferred arrangement with the flow control normally achieved by conventional apparatus.

Referring to the drawings, the principal components of the illustrated Fig. 1 suction unit include a positive displacement air pump 1 driven by a constant speed motor 2, the pump exerting its force through an upstream conduit 3 on a collecting filter 4. Other elements important to successful operations are a protective filter 6, a vacuum control valve generally indicated by the numeral 7, a vacuum relief valve 8, a pump discharge conduit 9, and a muffler 11. Also for some applications a venturi tube 12 and a flow monitoring gauge 13 are included.

Although, as will be more thoroughly explained, the principal novelty of the invention is found in the inclusion of vacuum control unit 7, proper selection of the other elements is quite important particularly when it is recalled that this unit is intended for use in a wide variety of applications and, therefore, must be relatively simple, rugged, and self-contained, and preferably, in addition, be sufficiently compact and light to permit its being readily transported. On the other hand, it will be appreciated that the various components involved all are quite well known and commercially available so that, for the most part, no detailed description of their structure or operation appears to be indicated.

Considering the various elements, it is evident that protective filter 6 is required to keep dirt and water out of the control valve and pump as well as prevent noxious aerosols, such as radioactive ones, from contaminating the rest of the suction unit is case of a break in the collecting filter. The principal requirements for the filter are an excellent retaining capacity and a low pressure drop. In one particular aerosol sampling unit a ¾" vacuum pipe line filter was used. Such a filter was found to have a pressure drop of only 2.2" of water with an air flow of 15 C. F. M. and its retaining capacity was excellent without appreciable increase in pressure drop.

As previously stated, pump 1 is a positive displacement air pump and its most important characteristic is its ability to maintain a constant volumetric displacement during operation. One suitable type of pump is a multi-vane rotary positive-displacement pump since it runs at a relatively high speed, produces the necessary suction, is relatively small for its capacity, operates with little pulsation, and has little leakage. Preferably, it also is desirable to have a pump in which the rotors and the case are made of materials having relatively low coefficients of thermal expansion, such construction reducing the differential expansion during its warm-up period and, therefore, improving the constant volumetric displacement during the warm-up. Motor 2 which is used to drive the pump, preferably is a constant speed motor under load and can be of most any type of electrical motor capable of maintaining a particular speed within 2% with voltage changes of plus or minus 10%. It is desirable to use a light, compact motor which is resistant to damage from corrosion or fungus and there are number of such motors commercially available. On the other hand, the arrangement is such that the electric motor can be replaced by a gasoline type motor or by a compressed air motor. For many applications a variable speed motor that is quickly and easily adjusted to produce and maintain any required speed over a wide range is to be preferred. The ability to produce varying speeds is important in permitting a selection of various flow rates, although, as will become apparent, minor adjustments in the flow rate can be achieved by changing the control point of vacuum control unit 7.

As to the remaining elements, muffler 11 is for the conventional purpose of reducing a pump noise and helping to smooth out pulsations and turbulances in the air before it reaches venturi tube 12. Tube 12 is a part of the flow monitoring system and such a tube is placed at the outlet of the system so that the air going into it always will be at a constant pressure unaffected by the varying suction on the collecting filter. Also, in this location a venturi tube is preferable to an orifice plate because a measurable signal is easily obtained without producing any objectionable back pressure on the pump.

The requirements of flow monitoring gauge 13 primarily are concerned with size and sensitivity, and one satisfactory gauge is a commercially available instrument having a 4" circular chart and a full scale reading of only 10" of water. Vacuum relief valve 8 is provided only as a safety feature in the event that the intake at the collecting filter is completely blocked. In such event the vacuum relief valve can be set to open and thereby prevent the suction from becoming sufficiently great to damage the pump or overload the motor.

As previously indicated, the inclusion of vacuum control unit 7 in the apparatus is perhaps the dominant feature of the invention, although, as will become apparent, the importance of the vacuum control unit lies principally in its operation as opposed to its particular structure. Structurally, as seen in Fig. 2, this unit is formed of a valve casing 21 provided with inlet and outlet openings 22 and 23 respectively and with an interior valve seat 24 adapted to receive a valve 26 which, when closed, divides the valve casing into inlet and outlet chambers 27 and 28 respectively. Valve 26 preferably is of a piston-type slidably mounted in a cylinder 29 threadably secured to the valve casing, and, as may be seen, the valve normally is urged toward a closed position by a small compression spring 31.

To open valve 26, a valve stem 32 is provided, this stem having its lower end abuttingly engaged with, but not secured to, the central part of valve 26 so that downward pressure on the stem causes the valve to open against the pressure of spring 31. Stem 32 projects upwardly through casing 21 and has its upper end bearing against a hub 33 of a resilient pressure-responsive diaphragm 36 which is mounted in a casing 34 and which divides its casing into upper and lower chambers 35 and 40. Hub 33, in turn, is threadably engaged to a spring rod or stem 37 about which is wound a compression spring 38 bearing at its upper end against a plate 39. At its lower end the stem bears against a plate 41. In the usual manner, the compression of the spring can be adjusted by rotating a knob 42.

Such being the structural arrangement, it will be appreciated that spring 38 normally tends to raise both diaphragm 36 and stem 32 permitting spring 31 to close valve 26. However, as previously stated, diaphragm 36 is pressure-responsive and, in its present application, it is responsive to the pressure within chamber 28 of the valve casing, as well as the atmospheric pressure in conduit 3 at a point proximate to the intake of pump 1. As may be seen in Figs. 1 and 2, the diaphragm is responsive to atmospheric pressure within chamber 28 due to the fact that chamber 28 is communicated with the diaphragm chamber 40 by means of an internal sensing passageway or bore 43 in valve casing 21. Also, the diaphragm is alternately made responsive to atmospheric pressure at a point near the pump intake by communicating diaphragm chamber 40 with conduit 3 by an external sensing conduit 44. Such being the case, it will be appreciated that the spring tension can be so adjusted that, when atmospheric pressure near the pump or within chamber 28 is sufficiently reduced, the diaphragm will be pushed downwardly carrying valve stem 32 with it and thereby opening the valve. Of course, to permit the diaphragm to move downwardly, it is necessary to communicate the area above the diaphragm (chamber 35) with atmosphere and this may be done by any suitable means such as providing a loose fit between hub 33 and plate 41, such a loose fit providing a passageway 46. Similarly, when the pressure below diaphragm 36 returns to a predetermined value, atmospheric pressure acting on the diaphragm through opening 46 is not sufficient to depress the diaphragm and, consequently, spring 38 is capable of returning the diaphragm to its normal position.

The manner in which the vacuum control unit is operated, as well as the manner in which it cooperates with the pump to maintain a constant intake flow at the filter is perhaps the most vital feature of the invention and probably can best be explained with reference to a particular example. Thus, in the particular application for which the illustrated apparatus was especially adapted, it was desired to provide an aerosol sampling unit capable of maintaining a fixed flow rate at the filter of between 1 to 15 C. F. M. Further, under anticipated filter conditions, it could be estimated that deposits on the filter during use would produce a pressure drop across the filter no more than 8 in. Hg (or that the pump would never need to exert more than 8 in. Hg suction on the filter). The next consideration would be to produce a pressure drop at the filter such as would effect the particular intake flow rate desired which, for example, might be assumed to be 10 C. F. M. It further could be determined that, with a clean filter or collecting medium, a pressure drop across the filter of only 1 in. Hg would be required to induce the 10 C. F. M. flow. Consequently, if the pump is run at 8 in. Hg suction in anticipation of the maximum demand, an initial line loss between the pump intake and the filter of 7 in. Hg would be needed.

Such being the fundamental demands of the sampling operation, the first important function of the vacuum valve becomes readily apparent and, as would be surmised, the valve is used to create this initial line loss or pressure drop of 7 in. Hg. Of course, there will be some line loss due to friction and turbulence but, for purposes of description, such a loss can be discounted and it then can be assumed that the valve itself is initially set in such an open condition as to produce the 7 in. Hg pressure drop across it. Such a setting of the valve is achieved by adjusting the compression of spring 38 to a point at which the control vacuum of 8 in. Hg at the pump intake exerts just enough suction pressure on diaphragm 36 as to effectively oppose the lift of the spring and cause valve stem 32 to open valve 26 to the precise extent necessary for creating the desired pressure drop of 7 in. Hg. It, of course, is appreciated that the statement to the effect that the control vacuum pulls down on the diaphragm is not technically correct since the motivating force for the diaphragm is the pushing force of atmospheric pressure admitted through opening 46 and developed through the pressure differential. However, to facilitate description, the broad conception of the vacuum pulling on the diaphragm is used in place of the more precise but involved statements regarding differential pressures. Also, it is to be noted that the vacuum to which the diaphragm is subjected is sensed both hrough conduit 44 and passageway 43 and the reason for the use of these two sensing means will be considered as a separate subject.

With the valve held in such an open position, it is apparent that so long as the suction pressure at the filter does not change, the vacuum (at the pump) sensed by the diaphragm will remain the same. However, as the filter becomes clogged with increasing deposits, the vacuum (at the pump) sensed by the diaphragm will momentarily increase. Considered in another light, when such clogging occurs, a pressure drop at the filter of only one inch Hg would not be sufficient to maintain the desired flow of 10 C. F. M. with the result that there would be such a reduced intake as would produce an increase vacuum. As has been explained, it is at this point that units in the prior art found difficulty in maintaining constant bow. Thus, in the earlier units, an increase in the flow resistance at the filter had to be offset by speeding-up the pump. The usual result was that an operator had to be constantly present and on the alert so as to make the necessary pump speed adjustments.

In the present apparatus the vacuum control valve immediately responds to any increased vacuum at the pump intake so as to vary the valve opening and, consequently, the pressure drop across the valve. Thus, if deposits on the filter produce a pressure drop across the filter of 5 in. Hg, the resulting increase in vacuum at the pump intake immediately exerts a greater pulling force on diaphragm 36 thereby opening valve 26 to such a greater extent as will produce across it a pressure drop of only 3 in. Hg. The important result of such an occurrence is that the control vacuum of 8 in. Hg is maintained and, as has been pointed out, as long as this control vacuum is maintained, the density or, in other words, the mass of free air handled by the fixed positive displacement pump remains the same. Obviously, so long as the pump is handling a constant amount of free air, the flow of free air into the filter is also constant. If the deposits on the filter increase, it also is evident that the valve will continue to open and to compensate for the increased pressure drop, such action continuing until the valve is fully open and the full control vacuum is applied to the filter. Any increased pressure drop beyond the control vacuum produces a situation precisely similar to the units in the prior art so that the constant flow characteristic of the invention is limited by the control vacuum used. It further should be clear that any decrease in the vacuum (increase in pressure) permits spring 38 to lift stem 32 with the result that valve spring 31 moves the valve toward a closing position.

Another feature of the invention is found in the duplicate sensing means 43 and 44 and, generally considered, the use of such means is to assure as flat a response as possible to upstream pressure condition. Thus, in all spring loaded control valves, it is found that, if the external sensing means 44 is used alone, the flow into the suction unit decreases slightly as the spring is compressed with increasing filter vacuums, owing to the increased force exerted by the compressed spring. In contrast in some commercial control valves it has been found, if internal sensing means 43 is used alone, the flow into the suction unit increases with increasing filter vacuum. In fact, it is known that the vacuum at the downstream side of such valves (chamber 23) can be as much as 2 in. Hg greater than the vacuum at the intake to the pump and the reason for this effect probably can be found in a venturi action within the valve itself. For this reason, it has been found desirable in these applications to utilize both the external and internal sensing means so as to permit the decrease produced by the external sensing means to offset the increase caused by the venturi action present at the internal sensing means. It is possible that, if a valve were used which had an absolutely flat response and which produced no appreciable turbulence, it might be unnecessary to use both sensing means and one or the other would be adequate. However, for most commercially obtainable valves, the two sensing means are advisable and, if desired, a sensing valve can be incorporated in line 44 and can be adjustable to combine the best combination of internal and external sensing performance. It also is possible to design a valve with a fixed venturi effect or to use a separate venturi tube adjacent to the valve discharge.

Figure 3:
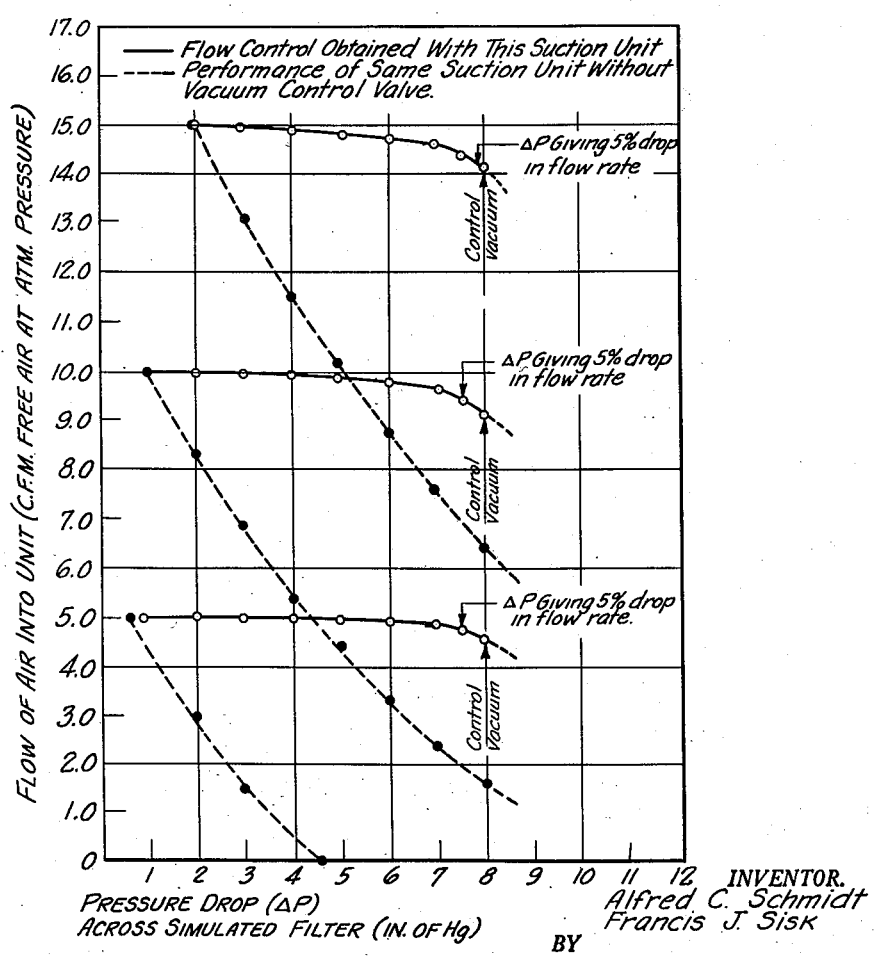

Such being the operation of the unit, it may be of some interest to consider the performance, and it is for this purpose that the plot of Fig. 3 is included. In obtaining the plot data, a manually-operated valve was connected to the inlet to simulate the filter. Also, a precision flow rating instrument was used for measuring air going into the simulated filter and mercury manometers for measuring vacuum. Tests were run first at 15, 10 and 5 C. F. M. and, subsequenly, the same tests were run with the vacuum control valve removed. Perhaps the significant part of the tests is that, when the control valve was used, the drop in flow was negligible at a filter vacuum of 2 in. Hg below the control vacuum of 8 in. Hg, and it amounted to only 5% at ½ in. Hg below the control vacuum. Considering that the instrument tested was a readily portable one adapted for field use, such performance is excellent. It also should be emphasized that these results are obtainable in fully automatic operation that requires no operator over long periods of time.

Obviously many modifications and variations of the present invention are possible in the light of the above teachings. It is, therefore, to be understood that within the scope of the appended claims the invention may be practiced otherwise than as specifically described.

We claim:

1. Apparatus for maintaining at a constant the intake fluid flow rate of a flow-permeable member, said apparatus comprising a fixed displacement pump, means for driving said pump at a constant speed for producing a predetermined reduced atmospheric suction pressure at the pump intake, a conduit communicating said pump intake with said flow permeable member, and pressure-responsive means normally introducing a predetermined pressure drop in said conduit whereby the amount of pump intake suction applied to said permeable member is limited and said suction draws fluid into said member at a desired flow rate, said pump intake suction varying only in response to variations in the flow resistance of the permeable member, and said limiting means being mechanically and automatically responsive to said pump intake pressure variations for altering said pressure drop sufficiently to offset said flow-resistant variations of said permeable member, whereby said desired flow rate of said permeable member is maintained.

2. Apparatus for maintaining at a constant the intake fluid flow rate of a flow-permeable member, said apparatus comprising a fixed displacement fluid pump, constant speed driving means for said pump, a conduit communicating the pump intake with said flow-permeable member, a valve in said conduit, and means responsive to fluid pressure conditions between said valve and said pump intake for actuating said valve, said means normally maintaining said valve in a position adapted to introduce a desired pressure drop across the valve opening, and said means responding to pump intake pressure fluctuations produced by variations in the flow-resistance of said permeable member for varying said valve opening and its pressure drop sufficiently to compensate for said flow resistant variation.

3. Apparatus for maintaining a constant flow rate into a suction-powered air filter member, said apparatus comprising a fixed displacement air pump, means for driving said pump at a speed capable of producing a predetermined reduced atmospheric suction pressure at the pump intake, a conduit communicating said filter with said pump intake, a valve disposed in said conduit for limiting the amount of said suction at said filter whereby a desired flow rate into the filter is effected, pressure-sensitive valve actuating means, and sensing means for controlling said actuating means, said sensing means being arranged to subject said actuating means to varying pressure conditions at said pump intake whereby changes in said pump intake pressure produced by varying resistances to air flow at said filter actuate said valve, said actuation being adapted to vary the valve opening for varying the limited intake suction at said filter, said variation of the filter suction being sufficient to offset said variation in said air flow resistance whereby the flow rate into the filter is maintained.

4. Apparatus for maintaining a constant flow rate into a suction-powered air filter member, said apparatus comprising a fixed air displacement pump, a constant speed motor for driving said pump at a speed capable of producing a predetermined reduced atmospheric suction pressure at the pump intake, a conduit communicating said filter with said pump intake, a valve disposed in said conduit for limiting the amount of said suction at said filter whereby a desired flow rate into the filter is effected, pressure-sensitive spring-controlled valve actuating means, and a sensing means for controlling said actuating means, said sensing means being a conduit communicating said actuating means with said pump intake whereby changes in said pump intake pressure condition produced by varying resistances to air flow at said filter actuate said valve, said actuation being adapted to vary the valve opening and the limited intake suction at said filter, said variation of the filter suction being sufficient to offset said variation in said air flow resistance whereby the flow rate into the filter is maintained.

5. Apparatus according to claim 4, said valve including a venturi-shaped passageway on its discharge side, and sensing means including a passageway communicating actuating means with said venturi neck and another passageway communicating the actuating means with a portion of the conduit near said pump intake.

6. Apparatus for maintaining at a constant the intake pressure of a fixed air displacement pump disposed in a circuit subject to up-stream flow resistance, the apparatus including means for driving said pump at a constant speed for producing a desired pump intake pressure, means disposed up-stream of said pump intake for creating a pressure drop for limiting the amount of intake pressure applied up-stream of said pressure drop means, and means for varying said pressure drop proportionately with variations produced in said pump intake pressure, said pump intake pressure varying in proportion to said up-stream resistance whereby said pressure drop variations can off-set said resistance and maintain said intake pressure constant.

References Cited in the file of this patent

UNITED STATES PATENTS

| 1,729,027 | Brennan | Sept. 24, 1929 |
| 1,820,795 | Gordon et al. | Aug. 25, 1931 |
| 2,194,749 | Gregg | Mar. 26, 1940 |
| 2,208,261 | Jackson | July 16, 1940 |